US012772069B2

(12) United States Patent
Sasaki et al.

(10) Patent No.: US 12,772,069 B2

(45) Date of Patent: Oct. 20, 2026

(54) SYSTEM, EQUIPMENT, METHOD, AND PROGRAM

(71) Applicant: NTT, Inc., Tokyo (JP)

(72) Inventors: Motoharu Sasaki, Tokyo (JP); Toshiro Nakahira, Tokyo (JP); Takatsune Moriyama, Tokyo (JP)

(73) Assignee: NTT, Inc., Tokyo (JP)

( * ) Notice: Subject to any disclaimer, the term of this patent is extended or adjusted under 35 U.S.C. 154(b) by 312 days.

(21) Appl. No.: 18/549,232

(22) PCT Filed: Apr. 14, 2021

(86) PCT No.: PCT/JP2021/015507

§ 371 (c)(1),
(2) Date: Sep. 6, 2023

(87) PCT Pub. No.: WO2022/219757

PCT Pub. Date: Oct. 20, 2022

(65) Prior Publication Data

US 2024/0155366 A1 May 9, 2024

(51) Int. Cl.

*H04W 16/18* (2009.01)
*H04W 24/02* (2009.01)
*H04W 24/08* (2009.01)

(52) U.S. Cl.

CPC ........... *H04W 16/18* (2013.01); *H04W 24/02* (2013.01); *H04W 24/08* (2013.01)

(58) Field of Classification Search

None
See application file for complete search history.

(56) References Cited

U.S. PATENT DOCUMENTS

| | | | | |
|---|---|---|---|---|
| 2010/0003925 A1* | 1/2010 | Fujita | .................... | H04W 24/08 455/67.13 |
| 2012/0164952 A1* | 6/2012 | Lee | ....................... | H04W 24/08 455/67.11 |
| 2014/0051451 A1* | 2/2014 | Goldberg | .............. | H04W 16/24 455/446 |

(Continued)

FOREIGN PATENT DOCUMENTS

| | | | | |
|---|---|---|---|---|
| WO | WO-2019149353 A1 * | 8/2019 | ........... | H04B 7/0413 |
| WO | 2020/008911 | 1/2020 | | |

(Continued)

OTHER PUBLICATIONS

Ryuichi Takechi et al., "Technology to Optimize Radio Access Networks: SON", FUJITSU. 62.4, P449-454, Jul. 2011, https://www.fujitsu.com/downloads/JP/archive/imgjp/jmag/vol62-4/paper15.pdf.

*Primary Examiner* — Faruk Hamza
*Assistant Examiner* — Cassandra L Decker
(74) *Attorney, Agent, or Firm* — IPUSA, PLLC

(57) ABSTRACT

A system according to an embodiment is connected via a network to a communication control system that controls wireless communication quality by acquisition of information, prediction of the wireless communication quality based on the information, and control of wireless equipment based on the prediction. The system is configured to change at least one of a position or an antenna direction of a movable base station, or at least one of a radio wave reflection direction or radio wave reflection power of a reflector in response to a control request from the communication control system.

8 Claims, 6 Drawing Sheets

(56) References Cited

U.S. PATENT DOCUMENTS

| | | | | |
|---|---|---|---|---|
| 2016/0205667 | A1 * | 7/2016 | Shen ..................... | H04W 24/02 370/252 |
| 2019/0028172 | A1 * | 1/2019 | Hudson ................ | H04B 7/0469 |
| 2021/0266715 | A1 | 8/2021 | Uchiyama et al. | |
| 2022/0014934 | A1 | 1/2022 | Matsunaga et al. | |

FOREIGN PATENT DOCUMENTS

| | | |
|---|---|---|
| WO | 2020/202371 | 10/2020 |
| WO | 2021/024611 | 2/2021 |

* cited by examiner

SYSTEM, EQUIPMENT, METHOD, AND PROGRAM

TECHNICAL FIELD

The present invention relates to a technology for dynamically controlling the quality of wireless communication depending on a user's purpose of use.

BACKGROUND ART

In recent years, as the importance of social change through digitization increases, the communication volume of smartphones and the like increases, and various things are connected to each other due to the development of the Internet of Things (IoT), and a role of wireless communication is remarkably enhanced in every scene of life. On the other hand, various wireless communication standards have appeared in accordance with diversified applications of wireless communication, and a wireless frequency band to be used is expanding from several 100 MHz to several 10 GHz, and it has become necessary to properly use radio waves in frequency bands having different characteristics and various wireless communication standards depending on situations. In such a complicated heterogeneous wireless communication environment, it appears ideal that an appropriate wireless communication standard can be used at any time with a natural sense of use without user's consciousness.

CITATION LIST

Patent Literature

Patent Literature 1: Technology to Optimize Radio Access Networks: Self-Organizing Network (SON), July 2011, https://www.fujitsu.com/downloads/JP/archive/imgjp/jmag/vol 62-4/paper15.pdf

SUMMARY OF INVENTION

Technical Problem

However, the quality of wireless communication changes from moment to moment depending on situations, and the quality may not be stable due to an influence from a surrounding environment such as a user or a base station. For this reason, a technology for dynamically controlling the quality of wireless communication is required to enable the use of wireless communication with optimum quality depending on the user's purpose.

The present invention has been made in view of the above points, and an object of the present invention is to provide a technology for dynamically controlling the quality of wireless communication depending on the user's purpose of use.

Solution to Problem

According to the disclosed technology, there is provided a system connected via a network to a communication control system that controls wireless communication quality by acquisition of information, prediction of the wireless communication quality based on the information, and control of wireless equipment based on the prediction, the system being configured to change at least one of a position or an antenna direction of a movable base station, or at least one of a radio wave reflection direction or radio wave reflection power of a reflector in response to a control request from the communication control system.

Advantageous Effects of Invention

According to the disclosed technology, it is possible to dynamically control the quality of wireless communication depending on the user's purpose of use.

DESCRIPTION OF EMBODIMENTS

Hereinafter, an embodiment (present embodiment) of the present invention will be described with reference to the drawings. The embodiment described below is merely an example, and an embodiment to which the present invention is applied is not limited to the embodiment below.

(Overall Configuration Example of Communication Control System 10)

Figure 1:
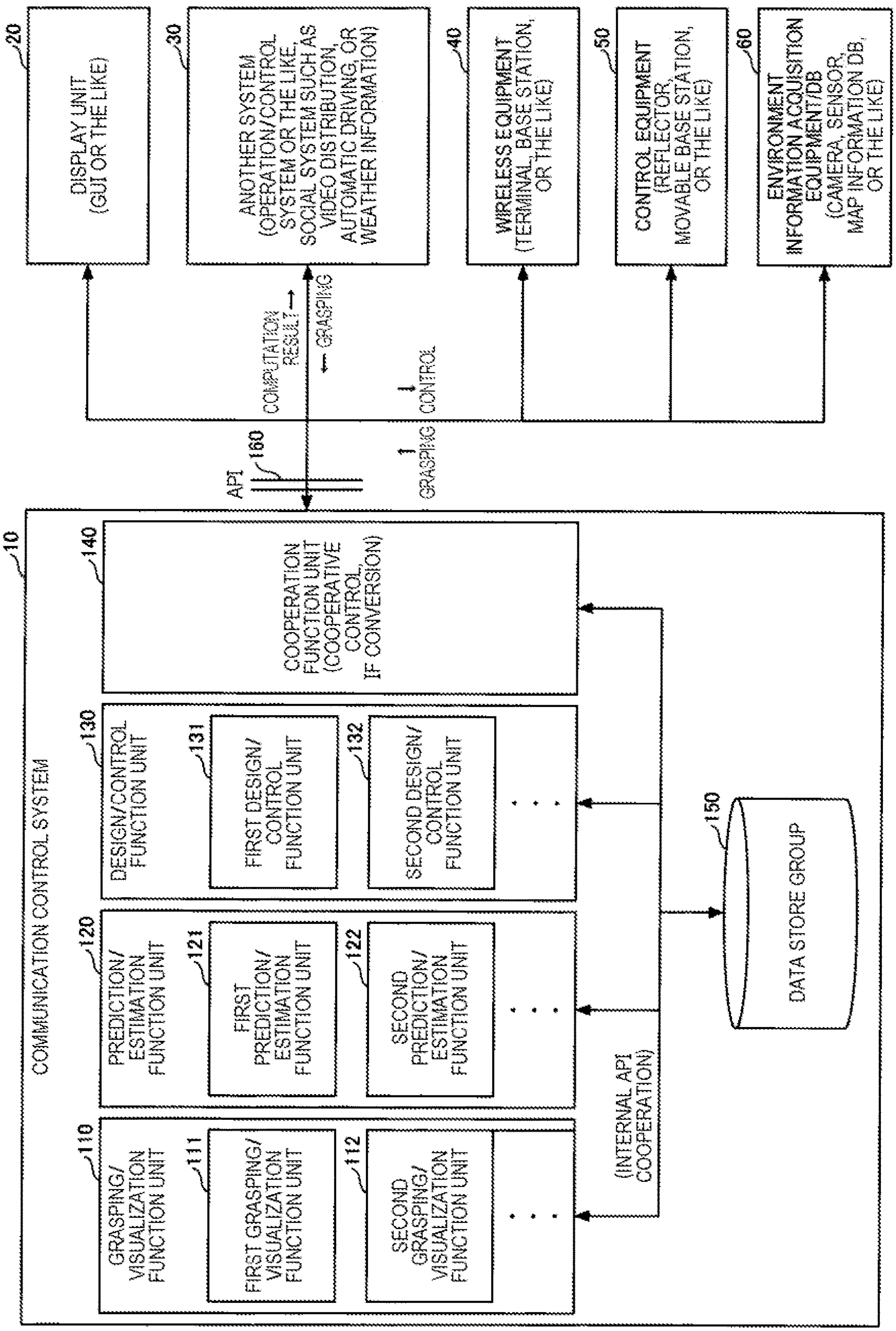
FIG. 1 is a diagram illustrating an overall configuration example of a communication control system according to a present embodiment.

FIG. 1 illustrates an overall configuration example of a communication control system 10 according to the present embodiment. As illustrated in FIG. 1, the communication control system 10 includes one or more grasping/visualization function units 110, one or more prediction/estimation function units 120, one or more design/control function units 130, a cooperation function unit 140, and a data store group 150. Note that the communication control system 10 may be referred to as a control system.

The grasping/visualization function unit 110 acquires various types of information from wireless equipment 40 (for example, a user terminal, a base station, or the like), an environment information acquisition equipment/DB 60 (for example, a camera, a sensor, a LiDAR/TOF, a DB that stores external data such as a map information DB, or the like), and control equipment 50 (for example, a reflector, a movable base station, or the like). Note that, DB is an abbreviation for database. In addition, the grasping/visualization function unit 110 visualizes the acquired information on a display unit 20 (for example, a graphical user interface (GUI) or the like). Examples of the information acquired by the grasping/visualization function unit 110 include wireless information such as received power, object information detected by wireless sensing, video information captured by a camera, sensor information sensed by a sensor, installation state information on the reflector or the movable base station, and the like. Besides these, for example, information indicating a recognition result by an image recognition technology, point cloud data by a depth sensor or the like, and the like can also be included. Note that the grasping/visualization function unit 110 may be referred to as an acquisition unit. In addition, in a case where there are a plurality of the grasping/visualization function units 110, and the plurality of the grasping/visualization function units 110 are distinguished from each other, the grasping/visualization function units 110 are referred to as a "first grasping/visualization function unit 111", a "second grasping/visualization function unit 112", and the like.

A set of the wireless equipment 40 described above constitutes a multi-wireless system. In the multi-wireless system, for example, a 3G-compatible base station provides a 3G wireless service, a 4G-compatible base station provides a 4G wireless service, a 5G-compatible base station provides a 5G wireless service, a 6G-compatible base station provides a 6G wireless service, and a wireless LAN base station provides a wireless LAN service. In addition, one base station may provide a plurality of wireless services among 3G, 4G, 5G, 6G, and wireless LAN.

A user terminal in the multi-wireless system performs communication while switching a wireless system along with movement or depending on a situation of wireless quality. For example, when moving from an area of the 4G-compatible base station to an area of the 5G-compatible base station, the user terminal switches the wireless system from 4G to 5G and continues communication.

The communication control system 10 in the present embodiment can acquire information from each wireless equipment 40 constituting the multi-wireless system as described above, and can perform optimum wireless parameter setting for each wireless equipment 40.

In addition, map information stored in a map information DB that is an example of the environment information acquisition equipment/DB 60 may be high-definition three-dimensional map information expressing a shape of a structure, a type of a tree, and the like. By using such high-definition three-dimensional map information, it is possible to perform wireless network design in consideration of influence of propagation loss and shielding due to buildings, trees, and the like.

The prediction/estimation function unit 120 predicts or estimates a wireless parameter such as wireless quality (quality of wireless communication) on the basis of the information acquired by the grasping/visualization function unit 110. Note that the prediction/estimation function unit 120 may be referred to as a prediction unit. In addition, in a case where there are a plurality of the prediction/estimation function units 120, and the plurality of the prediction/estimation function units 120 are distinguished from each other, the prediction/estimation function units 120 are referred to as a "first prediction/estimation function unit 121", a "second prediction/estimation function unit 122", and the like.

The design/control function unit 130 performs derivation of an optimum wireless parameter, derivation of a design value for the control equipment 50 such as the reflector, control of the control equipment 50, and the like on the basis of the information acquired by the grasping/visualization function unit 110, the wireless parameter predicted or estimated by the prediction/estimation function unit 120, and the like. Note that the design/control function unit 130 may be referred to as a control unit. In addition, in a case where there is a plurality of the design/control function units 130, and the plurality of the design/control function units 130 are distinguished from each other, the design/control function units 130 are referred to as a "first design/control function unit 131", a "second design/control function unit 132", and the like.

In response to a request from another system 30 (for example, an operation/control system or the like, a social system such as video distribution, automatic driving, or weather information, or the like), the cooperation function unit 140 appropriately combines and operate three function units of the grasping/visualization function unit 110, the prediction/estimation function unit 120, and the design/control function unit 130 depending on a situation (that is, the cooperation function unit 140 functions as an orchestrator that implements cooperative control of a plurality of function units). In addition, at this time, the cooperation function unit 140 also performs IF conversion such as data type conversion as appropriate. The another system 30 can call the three function units by using an application programming interface (API) 160. The cooperation function unit 140 may be referred to as a cooperation unit.

The cooperation function unit 140 can operate the grasping/visualization function unit 110, the prediction/estimation function unit 120, and the design/control function unit 130 to operate a cycle including acquisition of information by the grasping/visualization function unit 110, prediction of future wireless communication quality by the prediction/estimation function unit 120, and control on at least one of target equipment or a target system by the design/control function unit 130. By periodically operating such a cycle, for example, it is possible to continue to configure a network to always satisfy communication quality necessary for a user. Note that the target device includes the wireless equipment 40, the environment information acquisition equipment/DB 60, the control equipment 50, and the like, and the target system includes a self-driving vehicle control system, a video system for control, a self-driving vehicle traveling system, and the like described later. Note that, considering the "target device" broadly, the "target device" may include the wireless equipment 40, the environment information acquisition equipment/DB 60, the control equipment 50, and the like, and the self-driving vehicle control system, the video system for control, the self-driving vehicle traveling system, and the like.

That is, in a certain cycle, the grasping/visualization function unit 110 acquires a current wireless state, actual environment information, and the like implemented by the wireless equipment 40, the reflector 50, and the like designed and controlled by the design/control function unit 130 on the basis of the prediction of the future wireless communication quality. In the next cycle, when the prediction/estimation function unit 120 predicts that the future wireless communication quality deteriorates in a current setting state of the reflector 50 and the like, for example, on the basis of the current information, the design/control function unit 130 controls a radio wave reflection direction, radio wave reflection power, and the like by the reflector 50 so that the future wireless communication quality improves. Such a cycle is operated repeatedly, whereby it is possible to continue to configure the network to always satisfy the communication quality required by the user.

As the API 160, an API that calls an individual function unit among the three function units and an API that calls a scenario in which a plurality of function units is operated in cooperation are defined in advance. In a case where the scenario is called in which the plurality of function units is operated in cooperation, the cooperation function unit 140 calls the plurality of function units in a determined order by using the internal API on the basis of the scenario, and returns a final output result to a caller of the scenario.

The API 160 is disclosed to vendors and the like that develop the another system 30 and its application, and the like, and each vendor can develop a system or an application that implements various services by using the API 160.

The data store group 150 holds various data necessary for execution of the three function units of the grasping/visualization function unit 110, the prediction/estimation function unit 120, and the design/control function unit 130. The data store group 150 may be referred to as a data storage unit.

The communication control system 10 according to the present embodiment includes the above-described function units, and the grasping/visualization function unit 110, the prediction/estimation function unit 120, and the design/control function unit 130 operate in cooperation, whereby a wireless communication network is continuously configured to always satisfy the communication quality necessary for the user terminal. A wireless communication network that always satisfies the communication quality necessary for the user terminal is continuously configured by continuously operating a cycle of, for example, acquisition of various types of information by the grasping/visualization function unit 110, prediction or estimation of the wireless parameter by the prediction/estimation function unit 120, and control of the control equipment 50 by the design/control function unit 130. As a result, the user can use wireless communication with optimum quality depending on the user's purpose.

Hereinafter, Examples 1 to 4 will be described as examples of a technology according to the present embodiment. Note that Examples 1 to 4 can be implemented in combination as appropriate.

Operation Example in Example 1

Figure 2:
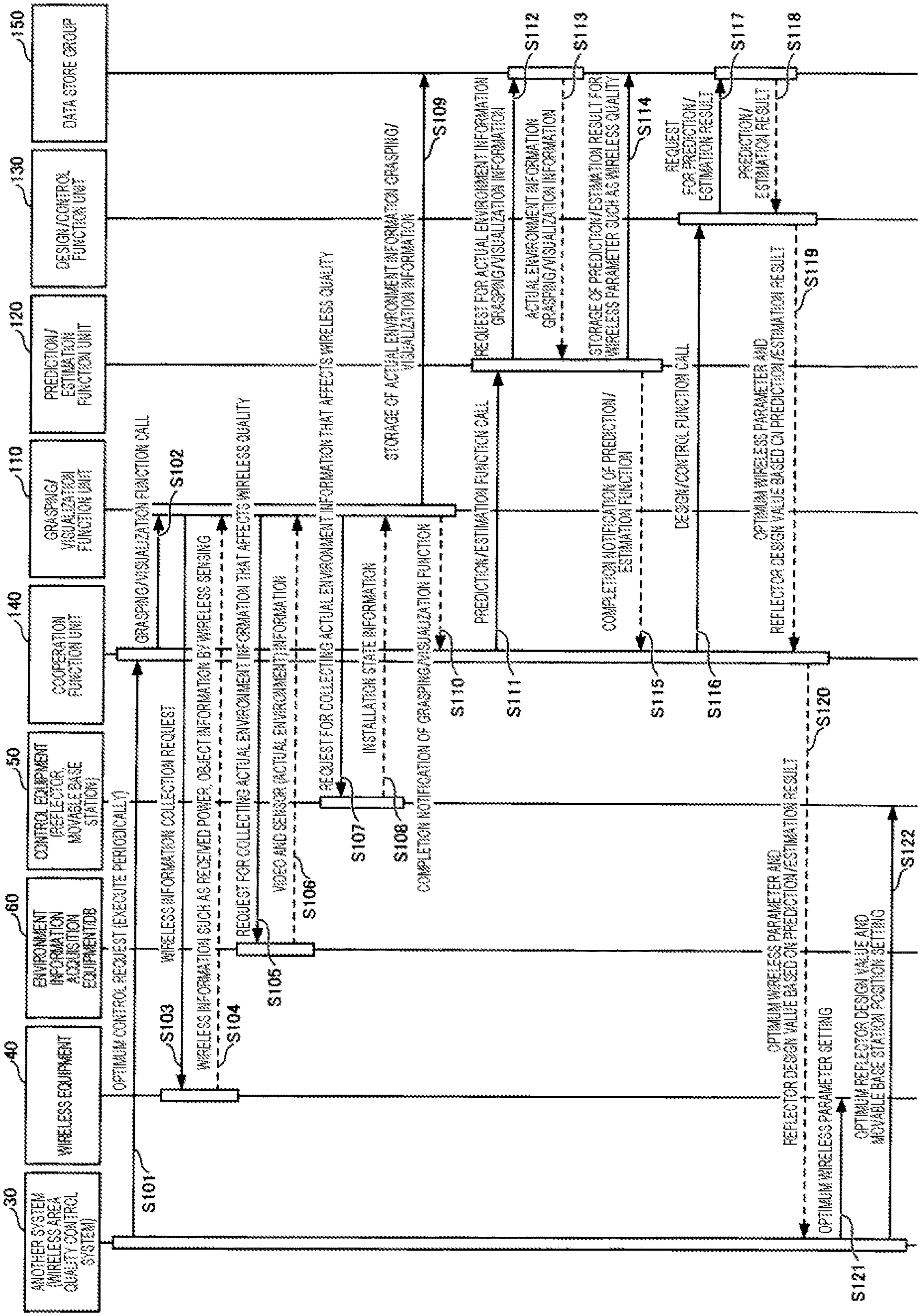
FIG. 2 is a sequence diagram for explaining an operation example in Example 1.

An operation example of the communication control system 10 in the present example will be described with reference to a sequence diagram of FIG. 2. In the present example, a case will be described where the communication control system 10 controls wireless area quality in response to a request from the another system 30, for optimum control of the wireless area quality. Note that, in the following description, it is assumed that the wireless equipment 40, the control equipment 50, and the environment information acquisition equipment/DB 60 are devices related to a wireless area as a target of the optimum control.

The cooperation function unit 140 receives an optimum control request from the another system 30 (for example, a wireless area quality system) (S101). Note that the optimum control request is periodically transmitted from the another system 30. In addition, the optimum control request is performed by using the API 160, whereby a scenario is called in which the optimum control of the wireless area quality is performed, and thereafter, the cooperation function unit 140 calls each function unit on the basis of the scenario.

The cooperation function unit 140 calls the grasping/visualization function unit 110 (S102). The grasping/visualization function unit 110 transmits a wireless information collection request to the wireless equipment 40 (S103). Then, the grasping/visualization function unit 110 acquires, as a response, wireless information such as received power of the wireless equipment 40 and object information detected by wireless sensing (that is, information on an object present around the wireless equipment 40) (S104). Note that, the object information may include a position of the object, and also, for example, a size and a shape of the object, and in a case where the object is moving, a moving speed or the like of the object.

Next, the grasping/visualization function unit 110 transmits a request for collecting actual environment information that affects the wireless quality to the environment information acquisition equipment/DB 60 (S105). Then, the grasping/visualization function unit 110 acquires, as a response, actual environment information (for example, video information captured by a camera, sensor information sensed by a sensor, map information, and the like) (S106). Note that the actual environment information may include not only the video information, the sensor information, and the like but also a result (for example, an image recognition result or the like) obtained by analyzing them by the environment information acquisition equipment/DB 60.

Next, the grasping/visualization function unit 110 transmits a request for collecting actual environment information that affects the wireless quality to the control equipment 50 (S107). Then, the grasping/visualization function unit 110 acquires, as a response, installation state information (S108). Note that the installation state information is, for example, the movable base station or position information, an angle or a direction of the reflector, information such as the radio wave reflection direction or radio wave reflection power, or the like.

Next, the grasping/visualization function unit 110 stores the information (Hereinafter, it is referred to as "actual environment information grasping/visualization information".) acquired in the above-described S104, S106, and S108 in the data store group 150, and transmits a completion notification to the cooperation function unit 140 (S109 to S110).

Subsequently, the cooperation function unit 140 calls the prediction/estimation function unit 120 (S111). The prediction/estimation function unit 120 transmits a request for the actual environment information grasping/visualization information to the data store group 150 (S112). Then, the prediction/estimation function unit 120 acquires, as a response, the actual environment information grasping/visualization information (S113). Note that, regarding the actual environment information grasping/visualization information, not only the information stored in the above-described S109, but also the actual environment information grasping/visualization information in the past necessary for prediction or estimation of the wireless quality may be acquired.

Then, the prediction/estimation function unit 120 predicts or estimates a wireless parameter indicating future wireless quality or the like on the basis of the actual environment information grasping/visualization information acquired in the above-described S113, stores a result (Hereinafter, it is referred to as a "prediction/estimation result") in the data store group 150, and transmits a completion notification to the cooperation function unit 140 (S114 to S115).

Note that the prediction or estimation of the wireless parameter is implemented by any predetermined method. For example, the wireless parameter only needs to be predicted or estimated by a machine learning model trained by a predetermined machine learning method. In addition, it is also possible to predict a propagation situation of a radio wave arriving at the wireless equipment 40 by a ray tracing method using actual environment information (high-definition three-dimensional map information or the like) and predict or estimate a wireless parameter on the basis of the propagation situation of the radio wave.

Subsequently, the cooperation function unit 140 calls the design/control function unit 130 (S116). The design/control function unit 130 transmits a request for the prediction/estimation result to the data store group 150 (S117). Then, the design/control function unit 130 acquires, as a response, the prediction/estimation result stored in the above-described S114 (S118). Thereafter, the design/control function unit 130 calculates an optimum wireless parameter and an optimum reflector design value on the basis of the acquired prediction/estimation result, and returns them to the another system 30 via the cooperation function unit 140 (S119 to S120). The optimum wireless parameter is, for example, a parameter for controlling the wireless equipment 40 to obtain wireless quality satisfying a predetermined standard (that is, a standard of the wireless quality necessary for the user terminal) in a case where the wireless quality indicated by the wireless parameter included in the prediction/estimation result is lower than the standard. Similarly, the optimum reflector design value is, for example, a design value for controlling the radio wave reflection direction, the radio wave reflection power, and the like of the reflector to obtain the wireless quality satisfying the predetermined standard in the case where the wireless quality indicated by the wireless parameter included in the prediction/estimation result is lower than the standard. Note that, in addition to these, for example, an optimum design value for controlling a position (and an antenna direction) of the movable base station may also be calculated so that the wireless quality satisfies the standard.

Next, the another system 30 sets the optimum wireless parameter and the optimum reflector design value returned from the cooperation function unit 140 for the wireless equipment 40 and the control equipment 50 (reflector), respectively (S121 to S122). Note that, at this time, in a case where the optimum design value for controlling the position (and the antenna direction) of the movable base station is also returned from the cooperation function unit 140, the another system 30 also sets the design value for the control equipment 50 (movable base station). As a result, for example, in the control equipment 50 (reflector), the angle, direction, and the like of the reflector are changed so that the radio wave reaches the user terminal. Similarly, for example, in the control equipment 50 (movable base station), the position, the antenna direction, and the like are changed so that the radio wave reaches the user terminal.

As described above, in response to the periodic optimum control request, the communication control system 10 in the present example predicts or estimates the future wireless quality on the basis of various types of information acquired from the wireless equipment 40, the control equipment 50, and the environment information acquisition equipment/DB 60, and then calculates the optimum wireless parameter and design value so that the future wireless quality satisfies the predetermined standard. As a result, it is possible to continue to configure the wireless communication network to always satisfy wireless communication necessary for the user terminal.

Operation Example in Example 2

Figure 3:
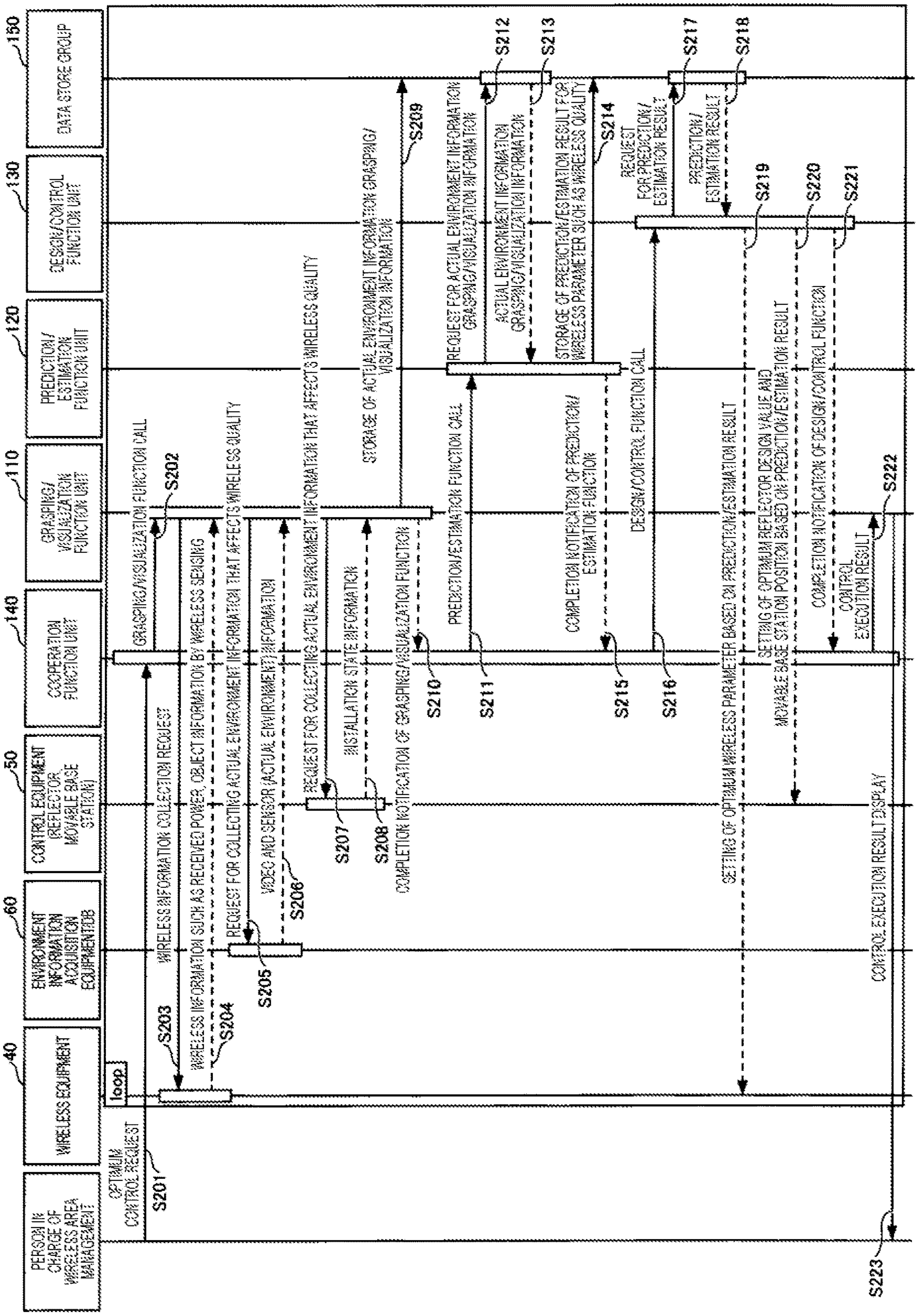
FIG. 3 is a sequence diagram for explaining an operation example in Example 2.

Next, an operation example of the communication control system 10 in the present example will be described with reference to a sequence diagram of FIG. 3. In the present example, a case will be described where the communication control system 10 continuously controls the wireless area quality in response to a request from a wireless area management terminal, for the optimum control of the wireless area quality. Note that, in the following, similarly to Example 1, it is assumed that the wireless equipment 40, the control equipment 50, and the environment information acquisition equipment/DB 60 are devices related to a wireless area as a target of the optimum control.

The cooperation function unit 140 receives an optimum control request from a person in charge of wireless area management (more precisely, a PC or the like used by the person in charge of wireless area management) (S201). When the optimum control request is received, the communication control system 10 periodically and repeatedly executes S202 to S221.

Since S202 to S218 are similar to S102 to S118 of Example 1, the description thereof will be omitted. Subsequent to S218, the design/control function unit 130 calculates an optimum wireless parameter and an optimum reflector design value on the basis of the acquired prediction/estimation result, and then sets the optimum wireless parameter in the wireless equipment 40 and sets the optimum reflector design value for the control equipment 50 (reflector) (S219 to S220). Note that, at this time, in a case where an optimum design value for controlling the position (and the antenna direction) of the movable base station is also calculated, the design/control function unit 130 also sets the design value for the control equipment 50 (movable base station).

Then, the design/control function unit 130 transmits a completion notification to the cooperation function unit 140 (S221). The cooperation function unit 140 transmits a control execution result to the grasping/visualization function unit 110 (S222). The control execution result includes, for example, information indicating that the control is normally completed. The grasping/visualization function unit 110 displays the control execution result to the person in charge of wireless area management (S223).

As described above, once receiving the optimum control request, the communication control system 10 in the present example predicts or estimates the future wireless quality on the basis of various types of information acquired from the wireless equipment 40, the control equipment 50, and the environment information acquisition equipment/DB 60, and then continuously repeats calculating the optimum wireless parameter and design value so that the future wireless quality satisfies the predetermined standard. As a result, similarly to Example 1, it is possible to continue to configure the wireless communication network to always satisfy the wireless communication necessary for the user terminal.

Operation Example in Example 3

Figure 4:
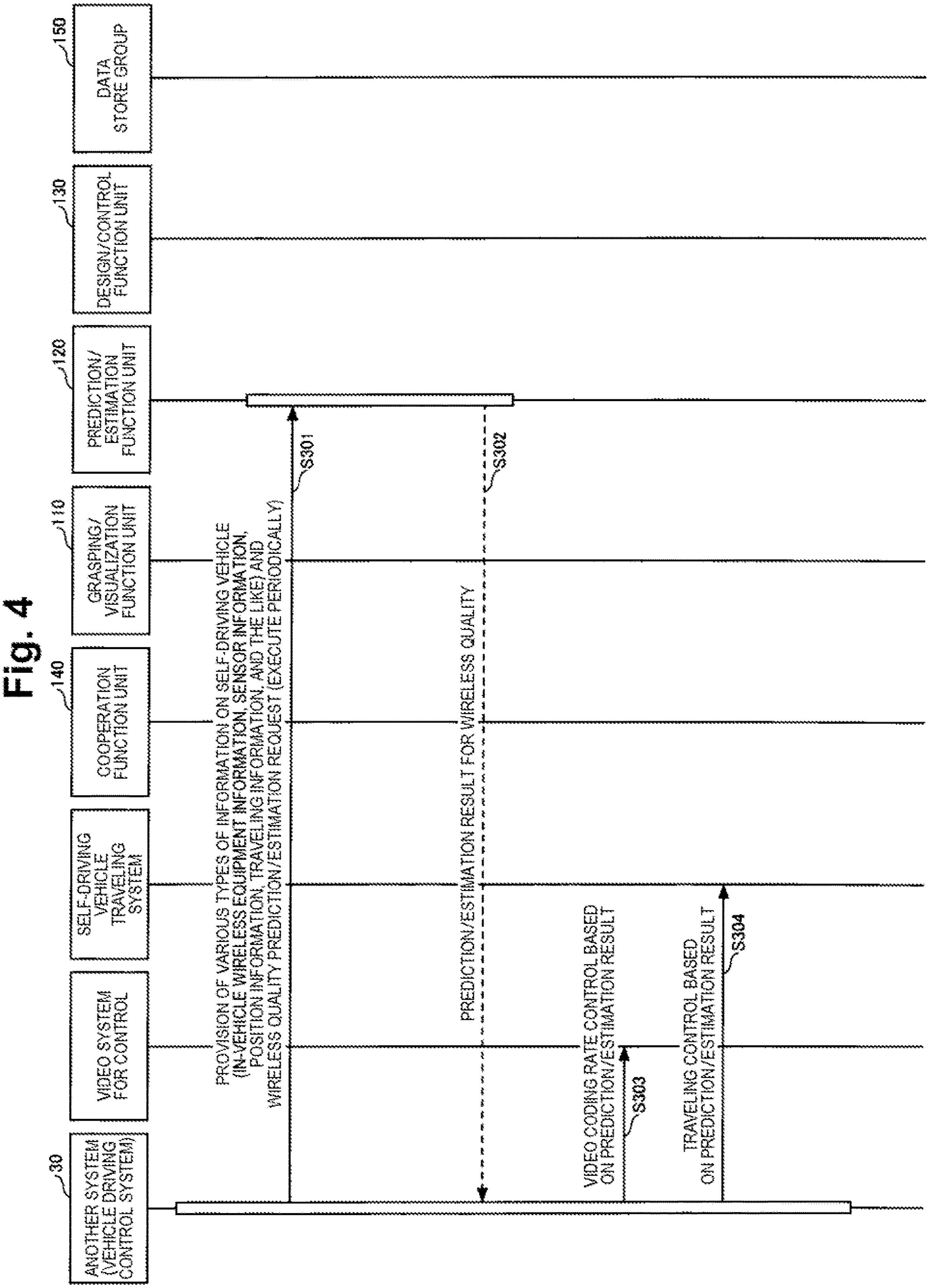
FIG. 4 is a sequence diagram for explaining an operation example in Example 3.

Next, an operation example of the communication control system 10 in the present example will be described with reference to a sequence diagram of FIG. 4. In the present example, a case will be described where wireless quality necessary for optimum control of a self-driving vehicle is predicted or estimated, and control related to automatic driving is implemented by a result of the prediction or estimation.

The prediction/estimation function unit 120 receives various types of information on the self-driving vehicle (for example, in-vehicle wireless equipment information, sensor information, position information, traveling information, and the like) and wireless communication quality prediction/estimation request from the another system 30 (for example, a self-driving vehicle control system) (S301). Here, the self-driving vehicle control system is a system that controls the entire self-driving vehicle. In addition, the various types of information on the self-driving vehicle are information obtained from the wireless equipment 40 and the environment information acquisition equipment/DB 60 mounted on the self-driving vehicle. For example, the in-vehicle wireless equipment information is information such as received power or the like of the wireless equipment mounted on the self-driving vehicle, the sensor information is information obtained by sensing an environment around the self-driving vehicle, the position information is information indicating a traveling position of the self-driving vehicle and three-dimensional map information near the traveling position, and the traveling information is information such as a speed of the self-driving vehicle. Note that the various types of information and the wireless communication quality prediction/estimation request are periodically transmitted from the another system 30. In addition, transmission of the various types of information and the wireless communication quality prediction/estimation request are performed by calling an individual function unit (prediction/estimation function unit 120) by using the API 160.

The prediction/estimation function unit 120 predicts or estimates the future wireless quality on the basis of the above-described various types of information on the self-driving vehicle, and returns a result (prediction/estimation result) to the another system 30 (S302). As a result, the another system 30 can perform video coding rate control based on the prediction/estimation result for the video system for control, and can perform traveling control based on the prediction/estimation result for the self-driving vehicle traveling system (S303 to S304). Here, the video system for control is a system for coding a video for controlling the self-driving vehicle, and the self-driving vehicle traveling system is a system for controlling traveling of the self-driving vehicle. Not that, as the video coding rate control based on the prediction/estimation result, for example, it is conceivable to perform control such that a coding rate is lowered in a case where the wireless quality is lower than the predetermined standard (that is, in a case where the wireless quality is poor), and the coding rate is not changed in a case where the wireless quality is not lower than the predetermined standard (alternatively, the coding rate is increased). In addition, as the traveling control based on the prediction/estimation result, for example, it is conceivable to perform control such that a traveling speed is reduced or a traveling route is changed in a case where the wireless quality is lower than the predetermined standard, and the traveling speed and the traveling route are not changed in a case where the wireless quality is not lower than the predetermined standard.

As described above, the communication control system 10 in the present example returns a prediction/estimation result for the future wireless quality to the another system 30 in response to periodic information provision and prediction/estimation request from the another system 30 (self-driving vehicle control system). As a result, it is possible to control video coding rate change for self-driving vehicle control, change of a traveling state, and the like on the basis of the prediction/estimation result, and as a result, it is possible to continue the automatic driving according to the quality of wireless communication.

Operation Example in Example 4

Figure 5:
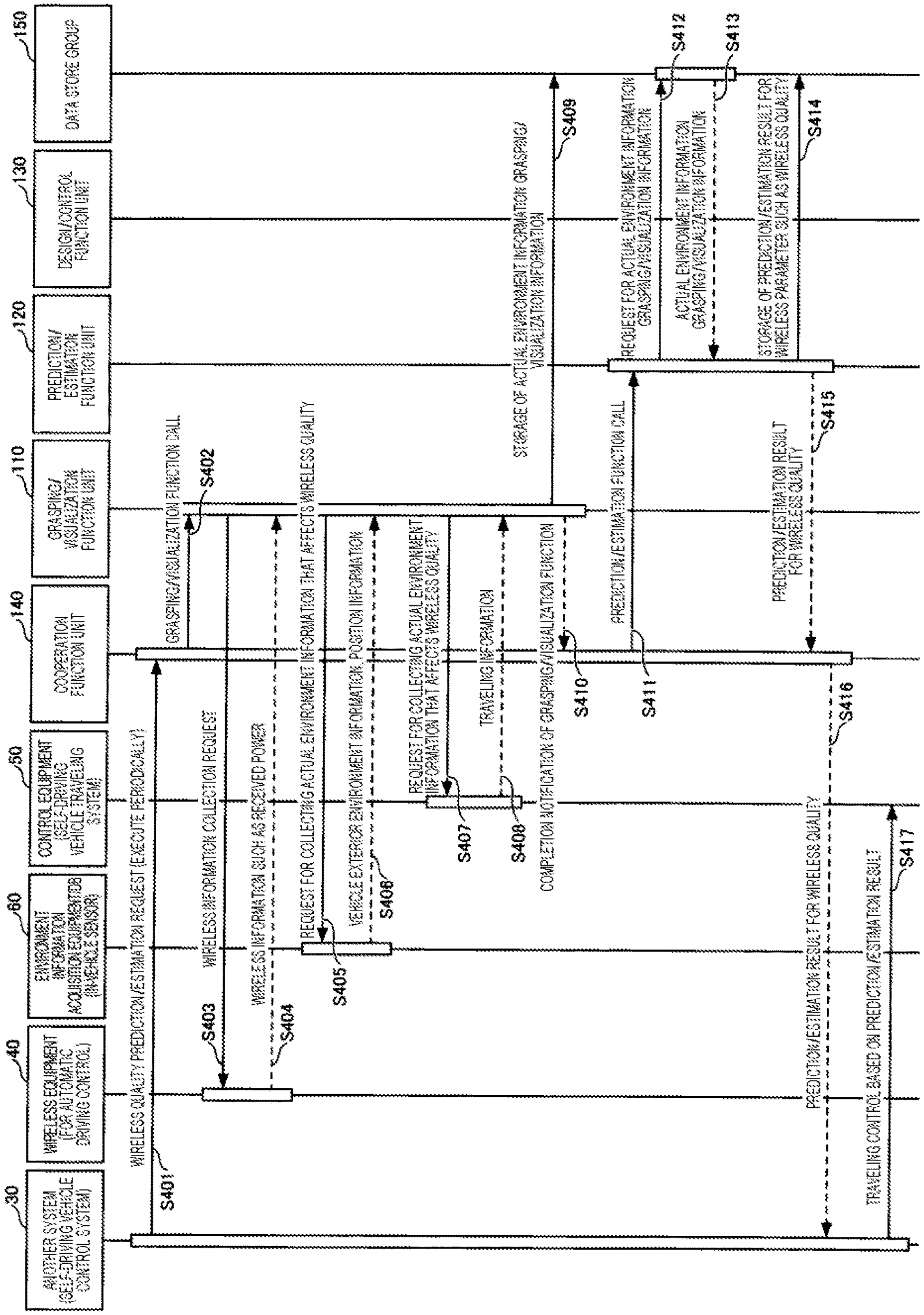
FIG. 5 is a sequence diagram for explaining an operation example in Example 4.

Next, an operation example of the communication control system 10 in the present example will be described with reference to a sequence diagram of FIG. 5. In the present example, a case will be described where the grasping/visualization function unit 110 acquires various types of information on the self-driving vehicle when the wireless quality necessary for optimum control of the self-driving vehicle is predicted or estimated. That is, in Example 3, various types of information on the self-driving vehicle are provided from the another system 30, but Example 4 is an example in a case where these various types of information are acquired by the grasping/visualization function unit 110.

The cooperation function unit 140 receives a wireless quality prediction/estimation request from the another system 30 (for example, a self-driving vehicle control system) (S401). Note that the wireless quality prediction/estimation request is periodically transmitted from the another system 30. In addition, the wireless quality prediction/estimation request is performed by using the API 160, whereby a scenario is called in which the wireless quality necessary for optimum control of the self-driving vehicle is predicted or estimated, and thereafter, the cooperation function unit 140 calls each function unit on the basis of the scenario.

The cooperation function unit 140 calls the grasping/visualization function unit 110 (S402). The grasping/visualization function unit 110 transmits a wireless information collection request to the wireless equipment 40 (for example, wireless equipment for automatic driving control or the like) (S403). Then, the grasping/visualization function unit 110 acquires, as a response, wireless information such as received power of the wireless equipment 40 (S404).

Next, the grasping/visualization function unit 110 transmits a request for collecting actual environment information that affects the wireless quality to the environment information acquisition equipment/DB 60 (for example, an in-vehicle sensor, a map information DB, or the like) (S405). Note that the map information DB may be a DB provided in the vehicle or may be a DB provided outside (cloud or the like). Then, the grasping/visualization function unit 110 acquires, as a response, vehicle exterior environment information that is information regarding the environment around the self-driving vehicle and position information of the self-driving vehicle (S406). Note that the vehicle exterior environment information is, for example, information obtained by LiDAR/TOF or the like (information such as a distance to an object around the self-driving vehicle and a shape of the object).

Next, the grasping/visualization function unit 110 transmits a request for collecting actual environment information that affects the wireless quality to the control equipment 50 (for example, a self-driving vehicle traveling system or the like) (S407). Then, the grasping/visualization function unit 110 acquires, as a response, traveling information (S408).

Next, the grasping/visualization function unit 110 stores the information (Hereinafter, it is referred to as "actual environment information grasping/visualization information") acquired in the above-described S404, S406, and S408 in the data store group 150, and transmits a completion notification to the cooperation function unit 140 (S409 to S410).

Subsequently, the cooperation function unit 140 calls the prediction/estimation function unit 120 (S411). The prediction/estimation function unit 120 transmits a request for the actual environment information grasping/visualization information to the data store group 150 (S412). Then, the prediction/estimation function unit 120 acquires, as a response, the actual environment information grasping/visualization information (S413). Note that, regarding the actual environment information grasping/visualization information, not only the information stored in the above-described S409, but also the actual environment information grasping/visualization information in the past necessary for prediction or estimation of the wireless quality may be acquired.

Then, the prediction/estimation function unit 120 predicts or estimates a wireless parameter indicating future wireless quality or the like on the basis of the actual environment information grasping/visualization information acquired in the above-described S413, stores a result (Hereinafter, it is referred to as a "prediction/estimation result") in the data store group 150, and returns the result to the another system 30 via the cooperation function unit 140 (S414 to S416). Note that the prediction or estimation of the wireless parameter is implemented by any predetermined method. For example, the wireless parameter only needs to be predicted or estimated by a machine learning model trained by a predetermined machine learning method.

As a result, the another system 30 can perform traveling control based on the prediction/estimation result for the self-driving vehicle traveling system (S417).

As described above, in response to the periodic prediction/estimation request from the another system 30 (self-driving vehicle control system), the communication control system 10 in the present example predicts or estimates the future wireless quality on the basis of various types of information acquired from the wireless equipment for automatic driving control, the in-vehicle sensor, and the self-driving vehicle traveling system, and returns the prediction/estimation result to the another system 30. As a result, similarly to Example 3, it is possible to control the change of the traveling state of the self-driving vehicle and the like on the basis of the prediction/estimation result, and as a result, it is possible to continue the automatic driving according to the quality of wireless communication.

(Hardware Configuration Example)

The communication control system 10 according to the present embodiment can be implemented, for example, by causing a computer to execute a program describing processing contents described in the present embodiment.

The program can be recorded in a computer-readable recording medium (portable memory, or the like), and be stored or distributed. In addition, the program can also be provided through a network such as the Internet or an electronic mail.

Figure 6:
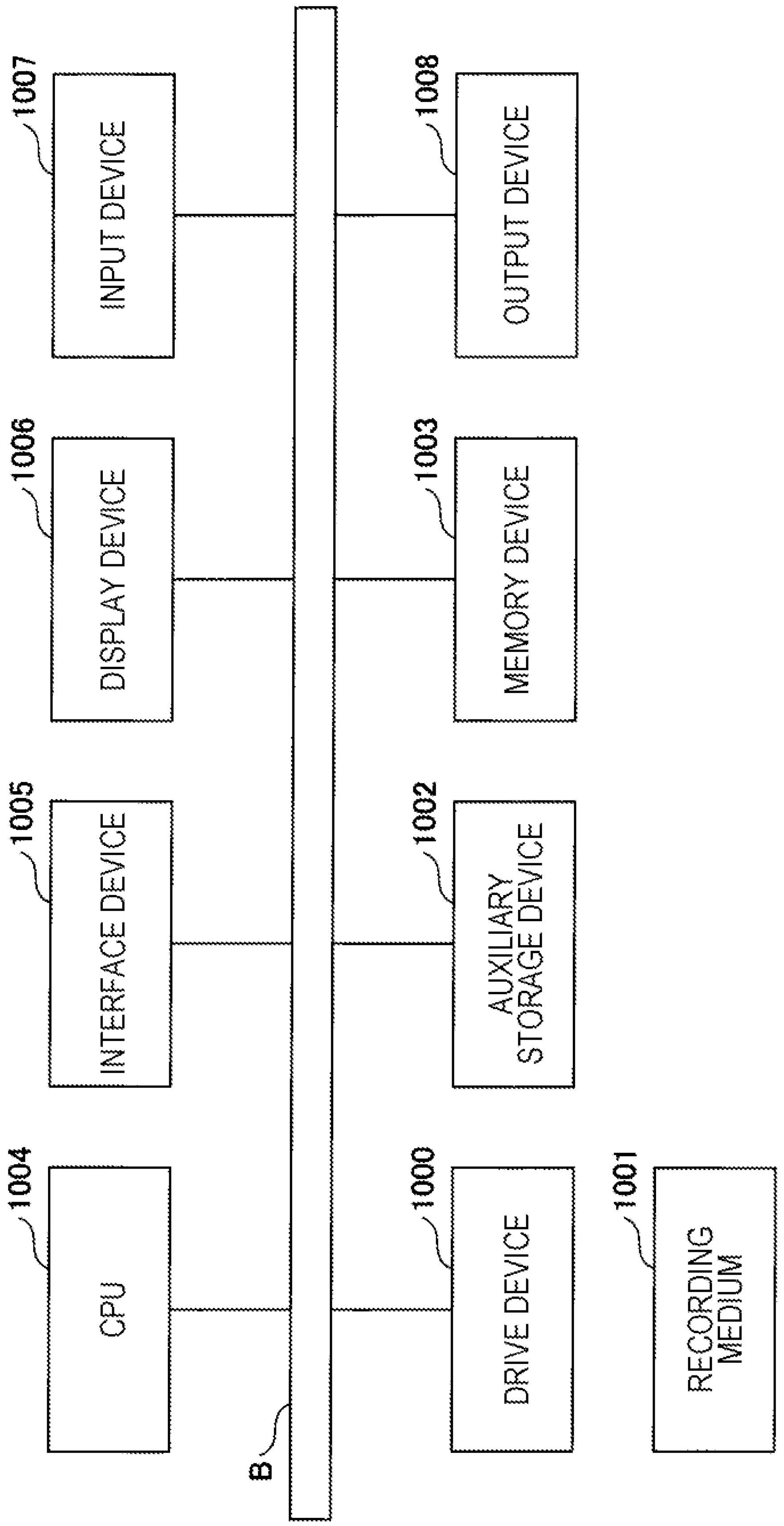
FIG. 6 is a diagram illustrating a hardware configuration example of equipment.

FIG. 6 is a diagram illustrating a hardware configuration example of the computer. The computer in FIG. 6 includes a drive device 1000, an auxiliary storage device 1002, a memory device 1003, a CPU 1004, an interface device 1005, a display device 1006, an input device 1007, an output device 1008, and the like, which are connected to one another by a bus B.

The program for implementing the processing in the computer is provided by, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. However, the program does not necessarily have to be installed from the recording medium 1001, and may be downloaded from another computer via a network. The auxiliary storage device 1002 stores the installed program and also stores necessary files, data, and the like.

In a case where an instruction to start the program is made, the memory device 1003 reads and stores the program from the auxiliary storage device 1002. The CPU 1004 implements functions related to the units described in the present embodiment in accordance with the program stored in the memory device 1003. The interface device 1005 is used as an interface for connecting to a network. The display device 1006 displays a GUI or the like by the program. The input device 1007 includes a keyboard and a mouse, buttons, a touch panel, or the like, and is used to input various operation instructions. The output device 1008 outputs a computation result. Note that the communication control system 10 may not include either or both of the display device 1006 and the input device 1007.

Effect of Embodiment

According to the technology according to the present embodiment, it is possible to dynamically control the quality of wireless communication depending on the user's purpose of use.

Summary of Embodiment

In the present specification, at least equipment, a method, and a program of the following clauses are disclosed.

(Clause 1)

A system connected via a network to a communication control system that controls wireless communication quality by acquisition of information, prediction of the wireless communication quality based on the information, and control of wireless equipment based on the prediction, the system being configured to change at least one of a position or an antenna direction of a movable base station, or at least one of a radio wave reflection direction or radio wave reflection power of a reflector in response to a control request from the communication control system.

(Clause 2)

The system according to clause 1, in which the control request includes a control parameter for changing at least one of the position or the antenna direction of the movable base station, or at least one of the radio wave reflection direction or the radio wave reflection power of the reflector.

(Clause 3)

The system according to clause 1 or 2, in which the communication control system repeatedly executes acquisition of information, prediction of wireless communication quality based on the information, and control of wireless equipment based on the prediction, and the system repeatedly receives a control request from the communication control system, and changes at least one of a position or an antenna direction of a movable base station, or at least one of a radio wave reflection direction or radio wave reflection power of a reflector whenever the control request is received.

(Clause 4)

Equipment connected via a network to a communication control system that controls wireless communication quality by acquisition of information, prediction of the wireless communication quality based on the information, and control of wireless equipment based on the prediction, the equipment being configured to transmit, to the communication control system, at least one of information regarding an object present around the equipment or environment information that affects the wireless communication quality as a response to an information acquisition request in response to the information acquisition request from the communication control system.

(Clause 5)

A method performed by a system, the system being connected via a network to a communication control system that controls wireless communication quality by acquisition of information, prediction of the wireless communication quality based on the information, and control of wireless equipment based on the prediction, the method comprising:

changing at least one of a position or an antenna direction of a movable base station, or at least one of a radio wave reflection direction or radio wave reflection power of a reflector in response to a control request from the communication control system.

(Clause 6)

A method performed by equipment, the equipment being connected via a network to a communication control system that controls wireless communication quality by acquisition of information, prediction of the wireless communication quality based on the information, and control of wireless equipment based on the prediction, the method comprising:

transmitting, to the communication control system, at least one of information regarding an object present around the equipment or environment information that affects the wireless communication quality as a response to an information acquisition request in response to the information acquisition request from the communication control system.

(Clause 7)

A program causing a computer to function as the system according to any one of clauses 1 to 3 or the equipment according to clause 4.

The present embodiment has been described above; however, the present invention is not limited to such a specific embodiment, and various modifications and changes can be made within the scope of the gist of the present invention described in the claims.

REFERENCE SIGNS LIST

10 communication control system
20 display unit
30 another system
40 wireless equipment
50 control equipment
60 environment information acquisition equipment/DB
110 grasping/visualization function unit
111 first grasping/visualization function unit
112 second grasping/visualization function unit
120 prediction/estimation function unit
121 first prediction/estimation function unit
122 second prediction/estimation function unit
130 design/control function unit
131 first design/control function unit
132 second design/control function unit
140 cooperation function unit
150 data store group
160 API
1000 drive device
1001 recording medium
1002 auxiliary storage device
1003 memory device
1004 CPU
1005 interface device
1006 Display device
1007 input device
1008 output device

The invention claimed is:

1. A system connected via a network to a communication control system, the communication control system being configured to:

acquire actual environment information that affects wireless communication quality of a plurality of wireless devices including one or more terminals and a movable base station, wherein the actual environment information comprises:

power information of the one or more terminals that uses wireless communication implemented by a multi-wireless system in an actual environment, information obtained by photographing or measuring the actual environment, and information indicating an installation state of the plurality of wireless devices;

predict the wireless communication quality based on the actual environment information; and transmit a control request for the wireless devices which is based on the prediction; and the system comprising:

a processor; and a memory storing instructions that cause the processor to perform changing at least one of a position or an antenna direction of the movable base station, or at least one of a radio wave reflection direction or radio wave reflection power of a reflector in response to a control request from the communication control system, wherein the communication control system calculates an optimum reflector design value for controlling the radio wave reflection direction or the radio wave reflection power of the reflector to obtain the wireless communication quality satisfying a predetermined standard in a case where the predicted wireless communication quality is lower than the predetermined standard, and the system changes the radio wave reflection direction or the radio wave reflection power of the reflector based on the optimum reflector design value included in the control request.

2. The system according to claim 1, wherein the control request includes a control parameter for changing at least one of the position or the antenna direction of the movable base station, or at least one of the radio wave reflection direction or the radio wave reflection power of the reflector.

3. The system according to claim 1, wherein the communication control system repeatedly executes acquisition of information, prediction of the wireless communication quality based on the information, and control of wireless equipment based on the prediction, and the processor repeatedly receives a control request from the communication control system, and changes at least one of a position or an antenna direction of a movable base station, or at least one of a radio wave reflection direction or radio wave reflection power of a reflector whenever the respective control request is received.

4. A method performed by the system according to claim 1, the method comprising:

changing at least one of a position or an antenna direction of the movable base station, or at least one of a radio wave reflection direction or radio wave reflection power of a reflector in response to a control request from the communication control system.

5. The system according to claim 1, wherein the actual environment information further comprises object information detected by wireless sensing, the object information indicating a position, a size, a shape, and a moving speed of an object present around the plurality of wireless devices, and the communication control system predicts the wireless communication quality by using a machine learning model based on the actual environment information including the object information.

6. The system according to claim 1, wherein the plurality of wireless devices are mounted on a self-driving vehicle, the actual environment information further comprises sensor information obtained by sensing an environment around the self-driving vehicle and traveling information including a traveling speed of the self-driving vehicle, and the communication control system calculates the optimum reflector design value to obtain the wireless communication quality satisfying the predetermined standard for continuing automatic driving of the self-driving vehicle.

7. Equipment connected via a network to a communication control system, the communication control system being configured to:

acquire actual environment information that affects wireless communication quality of one or more wireless devices including one or more terminals and a movable base station, wherein the actual environment information comprises:

power information of the one or more terminals that uses wireless communication implemented by a multi-wireless system in an actual environment, information obtained by photographing or measuring the actual environment, and information indicating an installation state of the one or more wireless devices, predict the wireless communication quality based on the actual environment information; and transmit a control request for the wireless devices which is based on the prediction, the equipment comprising:

a processor; and a memory storing instructions that cause the processor to perform transmitting, to the communication control system, the actual environment information in response to an information acquisition request from the communication control system, wherein the communication control system calculates an optimum reflector design value for controlling the radio wave reflection direction or the radio wave reflection power of the reflector to obtain the wireless communication quality satisfying a predetermined standard in a case where the predicted wireless communication quality is lower than the predetermined standard, and the equipment changes the radio wave reflection direction or the radio wave reflection power of the reflector based on the optimum reflector design value included in the control request.

8. A non-transitory computer-readable recording medium having computer-readable instructions stored thereon, which when executed, cause a computer to perform the method according to claim 4.

* * * * *